United States Patent
Kazas et al.

(10) Patent No.: US 11,443,381 B2
(45) Date of Patent: Sep. 13, 2022

(54) MULTICOMPUTER PROCESSING OF USER DATA WITH CENTRALIZED EVENT CONTROL

(71) Applicant: Allstate Insurance Company, Northbrook, IL (US)

(72) Inventors: Frank Kazas, Inverness, IL (US); Grady Irey, Des Plaines, IL (US); Soren K. Lundsgaard, Inverness, IL (US); Eric D. Huls, Chicago, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

(21) Appl. No.: 15/830,124

(22) Filed: Dec. 4, 2017

(65) Prior Publication Data

US 2019/0172146 A1    Jun. 6, 2019

(51) Int. Cl.
| | |
|---|---|
| *G06Q 40/08* | (2012.01) |
| *B60R 16/023* | (2006.01) |
| *G07C 5/00* | (2006.01) |
| *H04W 4/40* | (2018.01) |
| *H04W 12/00* | (2021.01) |
| *H04L 67/12* | (2022.01) |

(52) U.S. Cl.
CPC ......... *G06Q 40/08* (2013.01); *B60R 16/0231* (2013.01); *G07C 5/008* (2013.01); *H04W 4/40* (2018.02); *H04W 12/00* (2013.01); *H04L 67/12* (2013.01)

(58) Field of Classification Search
CPC .................................................... G06Q 40/08
See application file for complete search history.

(56) References Cited

U.S. PATENT DOCUMENTS

| | | | |
|---|---|---|---|
| 5,797,134 A | 8/1998 | McMillan et al. | |
| 8,255,275 B2 | 8/2012 | Collopy et al. | |
| 8,577,703 B2 | 11/2013 | McClellan et al. | |
| 8,818,618 B2 | 8/2014 | Follmer et al. | |
| 9,117,246 B2 | 8/2015 | McClellan | |
| 9,361,599 B1 | 6/2016 | Biemer et al. | |
| 10,169,822 B2 * | 1/2019 | Jarvis | G06Q 10/06398 |
| 10,475,127 B1 * | 11/2019 | Potter | B60R 25/102 |
| 10,878,510 B2 * | 12/2020 | Perl | G06Q 50/01 |

(Continued)

OTHER PUBLICATIONS

Apr. 15, 2019—(WO) ISR and WO—App PCT/US18/063197.

(Continued)

*Primary Examiner* — Michael A Berns
(74) *Attorney, Agent, or Firm* — Polsinelli PC

(57) ABSTRACT

Aspects of the disclosure relate to multicomputer processing of vehicle operational data from telematics devices and other sources with centralized event control. An event control computing platform may receive vehicle operational data from a telematics device associated with a user. Subsequently, the event control computing platform may identify, based on the received data, whether at least one criterion associated with the user has been satisfied. If the received data indicates that the at least one criterion associated with the user has been satisfied, then the event control computing platform may generate a command configured to cause a change to a subunit of user data and then may transmit the generated command to a subunit provisioning server.

20 Claims, 10 Drawing Sheets

(56) References Cited

U.S. PATENT DOCUMENTS

| | | |
|---|---|---|
| 2006/0195384 A1 | 8/2006 | Bauer et al. |
| 2006/0212195 A1 | 9/2006 | Veith et al. |
| 2007/0016512 A1 | 1/2007 | Kelly et al. |
| 2008/0177653 A1 | 7/2008 | Famolari et al. |
| 2010/0131300 A1 | 5/2010 | Collopy et al. |
| 2012/0010906 A1 | 1/2012 | Foladare et al. |
| 2012/0179493 A1 | 7/2012 | Giordano |
| 2014/0058761 A1 | 2/2014 | Freiberger et al. |
| 2014/0095214 A1 | 4/2014 | Mathe et al. |
| 2014/0279707 A1 | 9/2014 | Joshua et al. |
| 2015/0269681 A1 | 9/2015 | Kalinadhabhotla |
| 2017/0124660 A1* | 5/2017 | Srivastava ........... G07C 5/0808 |
| 2021/0166322 A1* | 6/2021 | Allen ................... G06Q 40/08 |

OTHER PUBLICATIONS

"New DriverScore App for Ford SYNC Helps Consumers with Good Driving Discounts," retrieved May 31, 2017, URL: https://www.at.ford.com/en/homepage/news-and-clipsheet/news/2017/1/driverscore.html, 2 pages.

"Usage-Based Insurance and Telematics," updated Mar. 1, 2017, National Association of Insurance Commissioners, retrieved May 31, 2017, URL: http://www.naic.org/cipr_topics/topic_usage_based_insurance.htm, 4 pages.

Maike, Cindy, "Hadpoop Use Case: Auto Insurance Pricing Based on Driver Behavior," Jan. 9, 2015; retrieved May 31, 2017, URL: https://hortonworks.com/blog/hadoop-use-case-auto-insurance-pricing-based-driver-behavior/, 4 pg.

Mearian, Lucas, "Insurers will now be able to Track Driver Behavior via Smartphones," Sep. 3, 2014, Computerworld, 7 pages.

\* cited by examiner

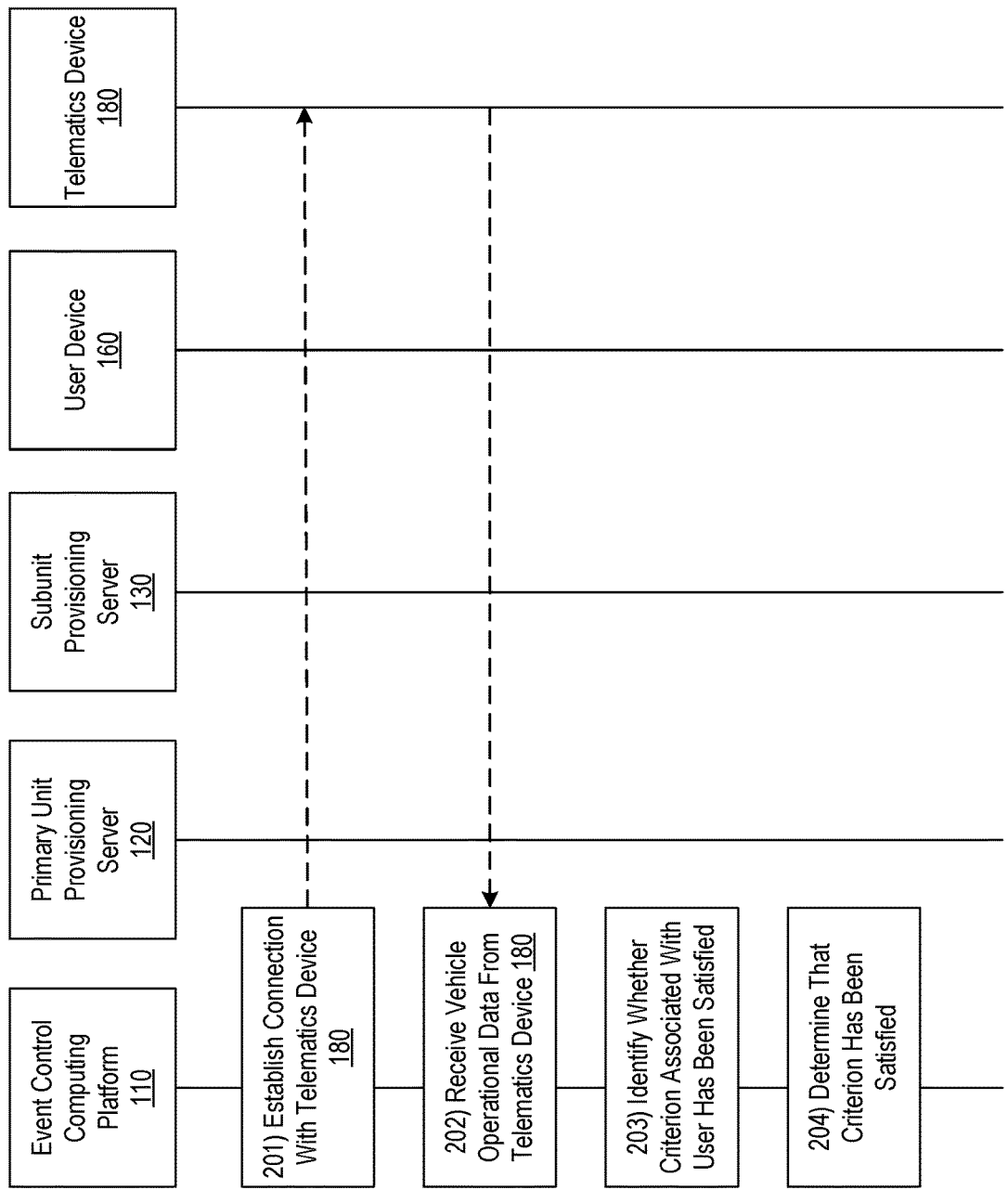

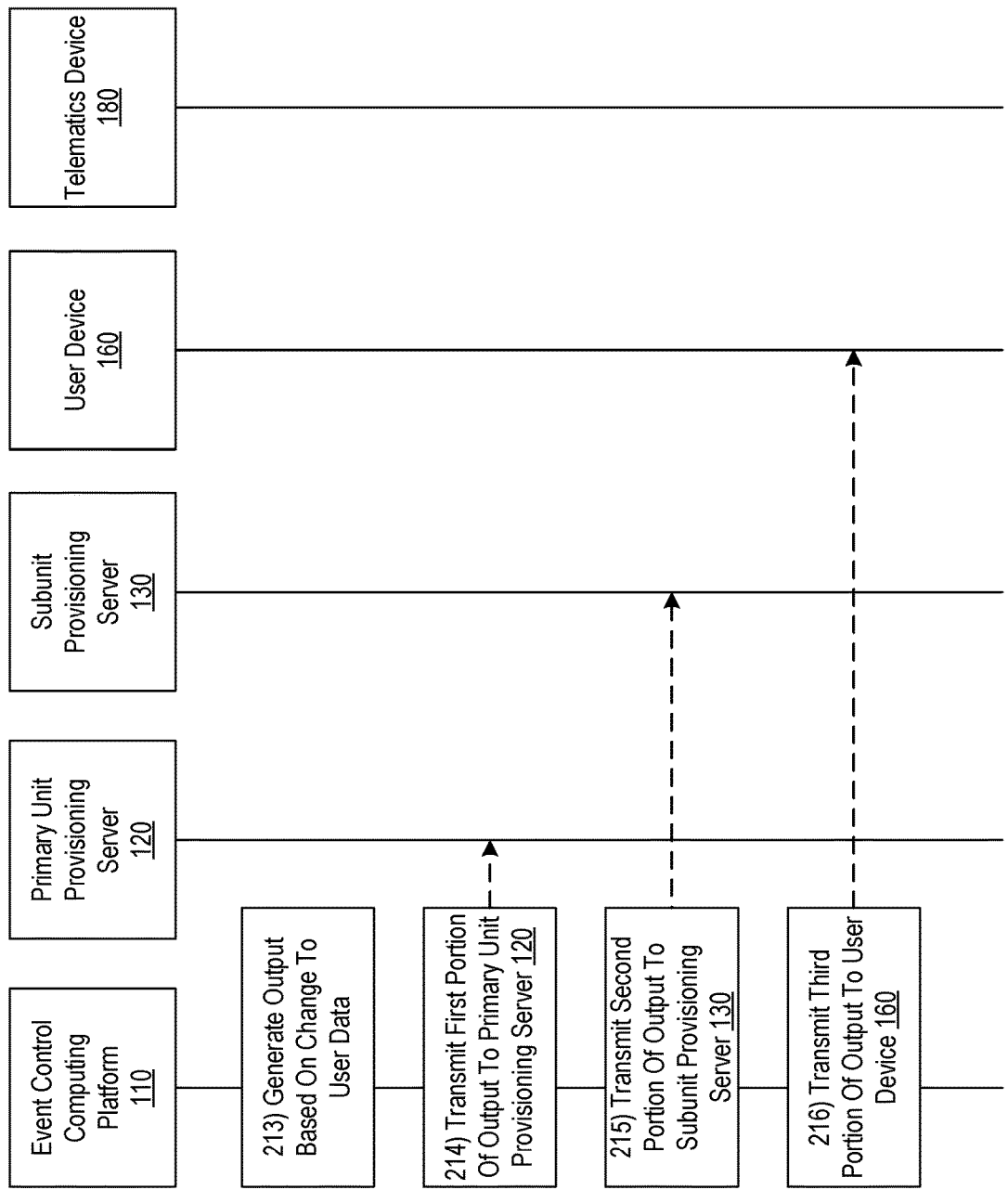

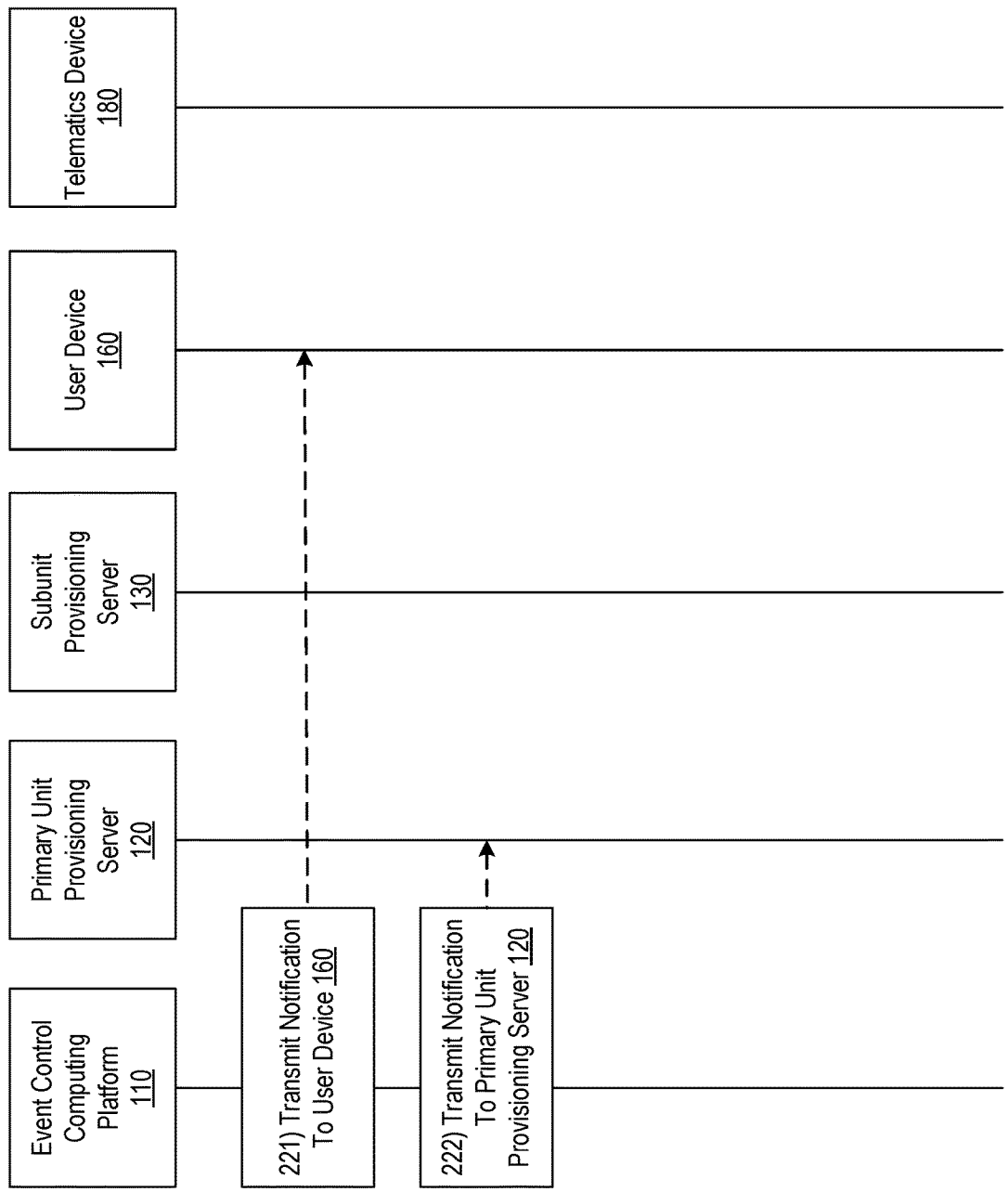

MULTICOMPUTER PROCESSING OF USER DATA WITH CENTRALIZED EVENT CONTROL

BACKGROUND

Aspects of the disclosure relate to electrical computers, digital processing systems, and multicomputer data processing. In particular, one or more aspects of the disclosure relate enabling multicomputer processing of data from telematics devices with centralized event control.

As computer systems are increasingly utilized to provide automated and electronic services, such computer systems may obtain and maintain increasing amounts of various types of sensitive information, and ensuring the safety, security, and accuracy of this information may be increasingly important. In many instances, however, it may be difficult to ensure the safety and security of such information while also optimizing the efficient and effective technical operations of the computer systems that process such information and/or provide such automated and electronic services.

SUMMARY

Aspects of the disclosure provide effective, efficient, scalable, and convenient technical solutions that address and overcome the technical problems associated with providing information security and optimizing the efficient and effective technical operations of computer systems. In particular, one or more aspects of the disclosure provide techniques for processing user data using multicomputer data processing technology and centralized event control to improve information security and enhance technical performance.

In accordance with one or more embodiments, an event control computing platform having at least one processor, a memory, and a communication interface may establish, via the communication interface, a connection to one of a plurality of telematics devices associated with a user. While the connection is established, the event control computing platform may receive vehicle operational data from the one of the plurality of telematics devices associated with the user. Subsequently, the event control computing platform may identify, based on the vehicle operational data, whether at least one criterion associated with the user has been satisfied. Then the event control computing platform may determine, based on the vehicle operational data, that the at least one criterion associated with the user has been satisfied. Next, in response to determining that at least one criterion associated with the user has been satisfied, the event control computing platform may generate a command configured to cause a change to a subunit of user data. Then the event control computing platform may transmit, via the communication interface, the command to a subunit provisioning server.

In some embodiments, the vehicle operation data may comprise real-time vehicle operational data. In other embodiments, the at least one criterion associated with the user may comprise driving a vehicle associated with the user below a predetermined speed. In other embodiments, the at least one criterion associated with the user may comprise driving a vehicle associated with the user within a predetermined geographic area. In yet other aspects, the at least one criterion associated with the user may comprise not exceeding a maximum rate at which pressure is applied to a braking mechanism associated with a vehicle of the user.

In further aspects, the event control computing platform may generate an output based on the change to the subunit of the user data. In some aspects, the event control computing platform may transmit a first portion of the output to a user computing device and a second portion of the output to a primary unit provisioning server. In other aspects, the event control computing platform may transmit a first portion of the output to a user computing device, a second portion of the output to a primary unit provisioning server, and a third portion of the output to a subunit provisioning server.

In some aspects, the event control computing platform may determine that the at least one criterion associated with the user is no longer satisfied (e.g., after determining that the at least one criterion associated with the user is satisfied, making a second, subsequent determination that the at least one criterion associated with the user is not satisfied). Further still, the event control computing platform may generate a second command configured to undo the change to the subunit of the user data. In other aspects, the event control computing platform may transmit, via the communication interface, the second command to the subunit provisioning server.

In other aspects, the user data may be associated with a first level before the change to the subunit of the user data and the subunit of the user data may be associated with a second level after the change to the subunit of the user data.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2F depict an illustrative event sequence for multicomputer processing of user data with centralized event control in accordance with one or more example embodiments;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Aspects of the disclosure relate to changing a subunit of data associated with a user in response to information received from one or more telematics devices. In some embodiments, the information from the telematics devices may correspond to vehicle operational data.

Figure 1A:
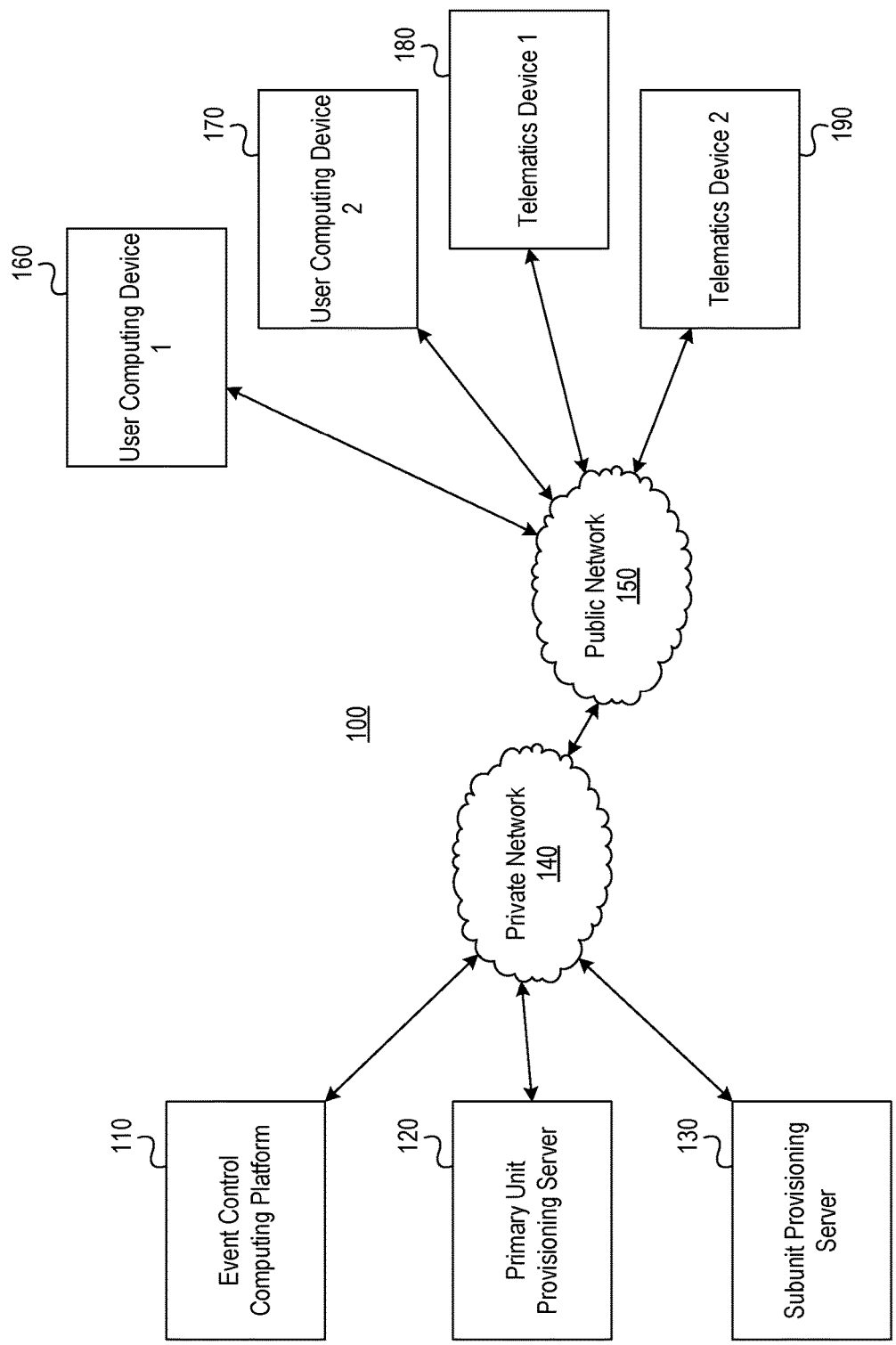
FIGS. 1A and 1B depict an illustrative computing environment for controlling events executed across multiple computing platforms and devices in accordance with one or more example embodiments.
Figure 1B:
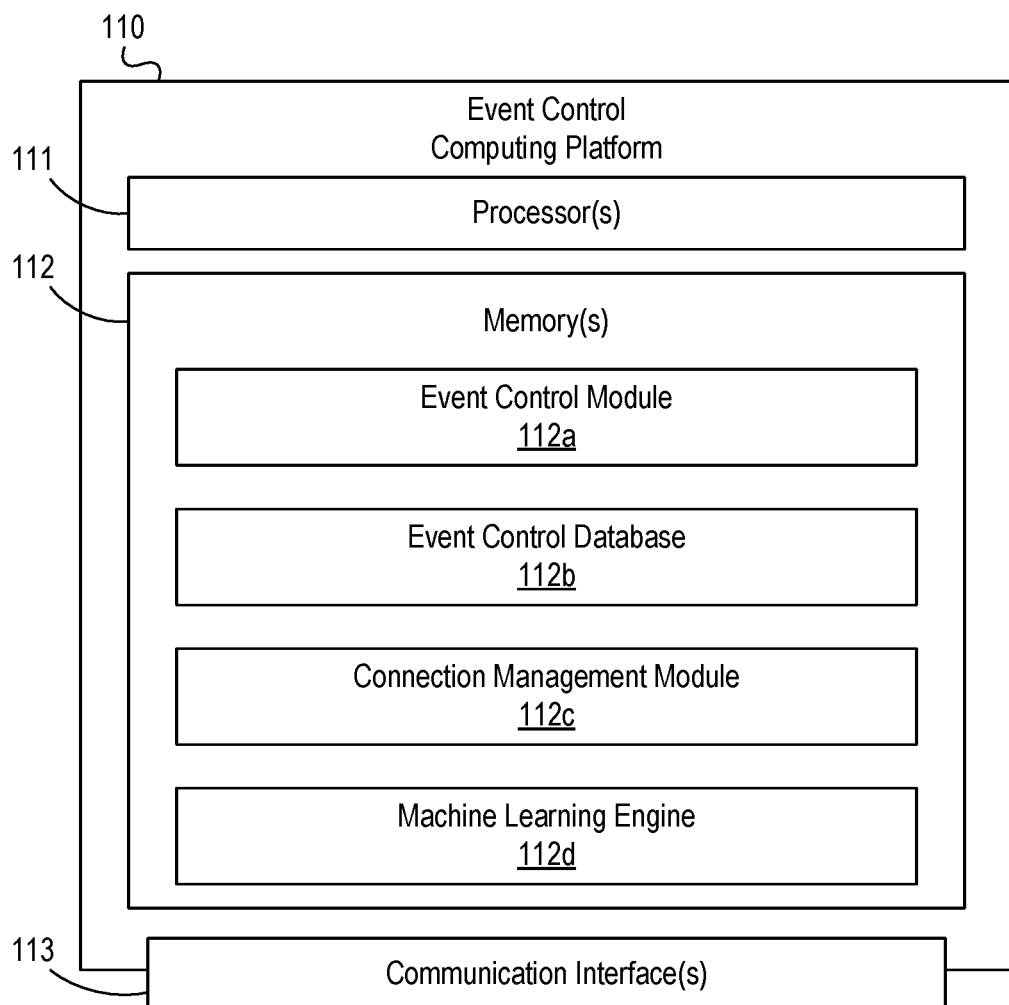

FIGS. 1A and 1B depict an illustrative computing environment for controlling events executed across multiple computing platforms and devices in accordance with one or more example embodiments. Referring to FIG. 1A, computing environment 100 may include one or more computer systems, one or more computer networks, and/or other computing infrastructure. For example, computing environment 100 may include an event control computing platform 110, a primary unit provisioning server 120, a subunit provisioning server 130, a private network 140, a public network 150, a first user computing device 160, a second user computing device 170, a first telematics device 180, and a second telematics device 190.

As discussed in greater detail below, event control computing platform 110 may include one or more computing devices configured to perform one or more of the functions described herein. For example, event control computing platform 110 may include one or more computers (e.g., laptop computers, desktop computers, servers, server blades, or the like) that are configured to orchestrate event control operations across multiple computer systems and devices in computing environment 100.

Primary unit provisioning server 120 may include one or more computing devices configured to provision primary units of data related to one or more users. Primary unit provisioning server 120 may also transmit, to event control computing platform 110 and/or one or more other systems, user information to event control computing platform 110 so that event control computing platform 110 may determine when events should proceed and/or otherwise be executed. In one example, the one or more events may correspond to initiating a sub-insurance policy for a given user when predetermined criteria associated with analysis of vehicle operational data have been satisfied. In this example, primary unit provisioning server 120 may provide primary insurance to insure the user and when the predetermined criteria have been satisfied, event control computing platform 110 may change a subunit of the user's data such that a sub-insurance policy insures the user. Event control computing platform 110 may generate and transmit a command to subunit provisioning server 130 to provide sub-insurance to insure the user.

Event control computing platform 110 may base the decision to change user data on various types of information, including telematics data, demographic data, transaction data, financial data, etc. For example, platform 110 may change user data based on how the user drives his vehicle during a predetermined time period. User vehicle operational data may be provided by telematics devices 180 and 190 to event control computing platform 110 through public network 150 and private network 140. In some aspects, telematics devices 180 and 190 may be associated with one or more vehicles operated by a given user or may be associated with different vehicles associated with different users. In general, computing environment 100 may include any number of telematics devices 180, 190. Devices 180 and 190 may monitor various parameters of the vehicle while the user is driving the vehicle. For example, devices 180 and 190 may monitor the speed at which the user is driving the vehicle, the time of day at which the user drives the vehicle, and the like. In some aspects, telematics devices 180 and 190 may provide this information directly to primary unit provisioning server 120 or subunit provisioning server 130 and primary unit provisioning server 120 or subunit provisioning server 130 may then forward this information to event control computing platform 110. In other aspects, devices 180 and 190 may transmit this information directly to event control computing platform 110.

Event control computing platform 110 may also generate an output based on the change to a subunit of user data. In one example, the output generated by platform 110 may correspond to a sub-insurance benefit resulting from initiating a sub-insurance policy associated with sub-insurance insuring a given user.

In one example, primary unit provisioning server 120 may be maintained by a primary insurance provider and may provision primary insurance to one or more users, such as users of user computing devices 160, 170. In general, computing environment 100 may include any number of user computing devices 160, 170 associated with many different users. Primary unit provisioning server 120 may also communicate with event control computing platform 110 and subunit provisioning server 130 through private network 140 and/or public network 150. In some aspects, platform 110 may be maintained by an organization that operates either primary unit provisioning server 120 or subunit provisioning server 130. In other examples, platform 110 may be maintained by an organization different from the organization that operates primary unit provisioning server 120 or subunit provisioning server 130.

In one example, subunit provisioning server 130 may be maintained by a sub-insurance provider and may provision sub-insurance to a given user when event control computing platform 110 has determined that at least one criterion associated with the user has been satisfied. In some aspects, this criterion may be related to vehicle operational data received from telematics devices 180, 190. In some aspects, the sub-insurance provided by sub-insurance provisioning server 130 may be associated with a level that is different from the level associated with the primary insurance provided by primary unit provisioning server 120. In one example, this level may correspond to a premium rate associated with the insurance provided by primary unit provisioning server 120 and/or subunit provisioning server 130.

Computing environment 100 also may include one or more networks, which may interconnect one or more of event control computing platform 110, primary unit provisioning server 120, subunit provisioning server 130, user computing device 160, user computing device 170, telematics device 180, and telematics device 190. For example, computing environment 100 may include private network 140, which may be owned and/or operated by a specific organization and/or which may interconnect one or more systems and/or other devices associated with the specific organization. For example, event control computing platform 110, primary unit provisioning server 120, and subunit provisioning server 130 may be owned and/or operated by a specific organization, such as an affiliation of insurance companies, and private network 140 may interconnect event control computing platform 110, primary unit provisioning server 120, subunit provisioning server 130, and one or more other systems and/or devices associated with the organization. Additionally, private network 140 may connect (e.g., via one or more firewalls) to one or more external networks not associated with the organization, such as public network 150. Public network 150 may, for instance, include the internet and may connect various systems and/or devices not associated with the organization operating private network 140. For example, public network 150 may interconnect user computing devices 160, 170, telematics devices 180, 190, and/or various other systems and/or devices.

In some arrangements, the computing devices that make up and/or are included in event control computing platform 110, primary unit provisioning server 120, subunit provisioning server 130, user computing devices 160, 170, and telematics devices 180, 190 may be any type of computing device capable of receiving a user interface, receiving input via the user interface, and communicating the received input to one or more other computing devices. For example, the computing devices that make up and/or are included in event control computing platform 110, primary unit provisioning server 120, subunit provisioning server 130, user computing devices 160, 170, and telematics devices 180, 190 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of the computing devices that make up and/or are included in event control computing platform 110, primary unit provisioning server 120, subunit provisioning server 130, user computing devices 160, 170, and telematics devices 180, 190 may, in some instances, be special-purpose computing devices configured to perform specific functions.

Referring to FIG. 1B, event control computing platform 110 may include one or more processor(s) 111, memory(s) 112, and communication interface(s) 113. A data bus may interconnect processor(s) 111, memory(s) 112, and communication interface(s) 113. Communication interface(s) 113 may be one or more network interfaces configured to support communications between event control computing platform 110 and one or more networks (e.g., private network 140, public network 150). For example, event control computing platform 110 may establish one or more connections and/or communication links to one or more other systems and/or devices (e.g., primary unit provisioning server 120, subunit provisioning server 130, user computing devices 160, 170, and telematics devices 180, 190) via communication interface(s) 113, and event control computing platform 110 may exchange data with the one or more other systems and/or devices (e.g., primary unit provisioning server 120, subunit provisioning server 130, user computing devices 160, 170, and telematics devices 180, 190) via communication interface(s) 113 while the one or more connections and/or communication links are established. Memory(s) 112 may include one or more program modules having instructions that when executed by processor(s) 111 cause event control computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of event control computing platform 110 and/or by different computing devices that may form and/or otherwise make up event control computing platform 110.

For example, memory(s) 112b may have, store, and/or include an event control module 112a, an event control database 112b, a connection management module 112c, and a machine learning engine 112d. Event control module 112a may have, store, and/or include instructions that direct and/or cause event control computing platform 110 to orchestrate event control operations across multiple computer systems and devices in computing environment 100 and perform other associated functions, as discussed in greater detail below. Event control database 112b may store information used by event control computing platform 110 in orchestrating event validation operations and event control operations across multiple computer systems and devices in computing environment 100 and in performing other associated functions. Connection management module 112c may have, store, and/or include instructions that direct and/or cause event control computing platform 110 to establish one or more connections and/or communication links to one or more other systems and/or devices (e.g., primary unit provisioning server 120, subunit provisioning server 130, user computing devices 160, 170, and telematics devices 180, 190) via communication interface(s) 113 and/or to manage and/or otherwise control the exchanging of data with the one or more other systems and/or devices (e.g., primary unit provisioning server 120, subunit provisioning server 130, user computing devices 160, 170, and telematics devices 180, 190) via communication interface(s) 113 while the one or more connections and/or communication links are established. Machine learning engine 112d may have, store, and/or include instructions that direct and/or cause event control computing platform 110 to dynamically analyze data collected by event control computing platform 110 based on historical data sets and/or present operations and automatically optimize the functions provided by event control computing platform 110 based on analyzing such data.

Figure 2B:
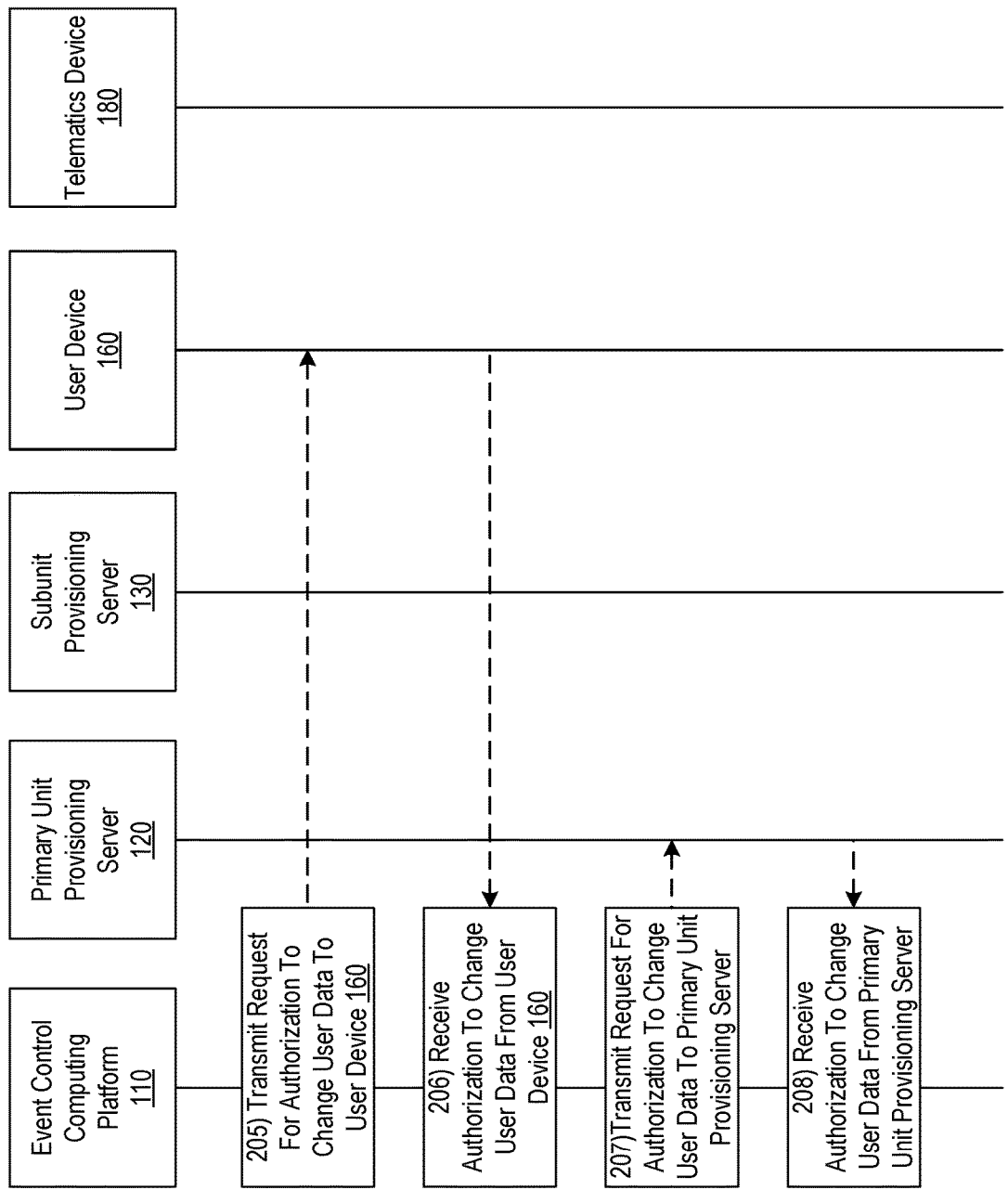

FIGS. 2A-2F depict an illustrative event sequence for multicomputer processing of user data with centralized event control in accordance with one or more example embodiments. Referring to FIG. 2A, at step 201, event control computing platform 110 may establish, via communication interface 113, a connection to a telematics device 180 associated with a vehicle of a given user and in step 202, event control computing platform 110 may receive vehicle operational data from telematics device 180. In general, event control computing platform 110 may establish connections to and receive vehicle operational data from any number of telematics devices.

In one example, event control computing platform 110 may be operated by an insurance company (e.g., a company that provides primary insurance products) or an affiliation of insurance companies. In this example, a primary insurance provider may have to use more closely regulated models to price risk than a sub-insurance provider. Even after a sub-insurance provider provides insurance coverage for the user (e.g., through subunit provisioning server 130), the user may still be serviced by the primary insurance provider (e.g., through primary unit provisioning server 120). In this way, the user may be served seamlessly by the primary insurance provider even though a sub-insurance provider may be providing insurance coverage for the user at any given time. In this example, a sub-insurance provider may price risk associated with a sub-insurance policy based on factors that are different from those used by the primary insurance provider. In other aspects, a sub-insurance provider may price risk associated with a sub-insurance policy in real-time as the sub-insurance provider acquires new telematics data related to the user. In this aspect, insurance coverage by the sub-insurance provider may be triggered based on satisfaction of predetermined criteria associated with the telematics data.

In this example, telematics data may be received by event control computing platform 110 from a telematics device 180 associated with a vehicle operated or owned by a given user. Telematics device 180 may be any type of computing device configured to receive data associated with insured property of the user, including intelligent personal assistant devices capable of voice interaction, music playback, making to-do lists, setting alarms, streaming podcasts, playing audiobooks, and providing weather, traffic, and other real time information such as news. Telematics device 180 may also be a smart thermostat that is programmable, has self-learning capabilities, and is Wi-Fi enabled. Additionally or alternatively, the telematics data may be received directly from the user or from primary unit provisioning server 120 operated by a primary insurer. Platform 110 may also process the received data by formatting it appropriately for later use. Moreover, in this example, the insurance policy covering the insured items in question may be any type of insurance policy, including a vehicle or homeowner's insurance policy. In the example where the insurance policy is relates to property other than a vehicle, platform 110 may receive information from a computing device 180 related to the insured property (e.g., home, etc.) in step 202.

In this example, event control computing platform 110 may first receive a notice from primary unit provisioning server 120 that the user is insured via a primary insurance policy at a first premium rate. The notice may be transmitted to subunit provisioning server 130 and may solicit a bid from subunit provisioning server 130 for sub-insuring at least some of the risk associated with the user's primary insurance policy. Once this notice is received, subunit provisioning server 130 may determine an appropriate bid (e.g., a second premium rate) for a given sub-insurer and transmit this bid back to event control computing platform 110. Platform 110 may then evaluate the bid and accept or reject the bid.

Moreover, the received telematics data may include both real-time and non real-time data. For example, telematics device 180 may capture data about the operational state of a vehicle. The operational state of the vehicle may include information related to the location that the vehicle has traveled, inspection history, speed, distances traveled, type and model of the vehicle, average braking time, time during which the vehicle is used, weather conditions during vehicle use, type of terrain over which the vehicle is driven, and average acceleration/deceleration time, among other things.

Then, at step 203, event control computing platform 110 may identify whether at least one criterion associated with the user has been satisfied to allow a subunit of user data to be changed. This identification may occur based on an analysis of the received vehicle operational data and/or other information in view of predefined rules programmed into platform 110 (e.g., machine learning engine 112d). If platform 110 determines that the at least one criterion associated with the user has not been satisfied to allow a subunit of user data to be changed, then the process may stop. However, in step 204, platform 110 may determine that the at least one criterion associated with the user has been satisfied to allow a subunit of user data to be changed.

In one example, the change to a subunit of user data may correspond to initiation of a sub-insurance policy by subunit provisioning server 130. Thus, in this example, the user may initially be insured by a primary insurance policy provisioned by primary unit provisioning server 120 and once platform 110 determines that predetermined criteria have been satisfied, the user may then be insured by a sub-insurance policy provisioned by sub-insurance provisioning server 130. In this regard, platform 110 may monitor the user's driving behavior in real-time to determine if one or more criteria have been satisfied so that a sub-insurance policy can be initiated. If at least one criterion associated with the telematics data has been satisfied, then platform 110 may determine that a sub-insurance policy should be initiated.

In this example, the criteria used to determine whether a sub-insurer should insure part of the risk associated with the primary insurance policy of the user may be determined from any information found in the received information. In other aspects, the criteria used to initiate a sub-insurance policy may be based on other information about the user (e.g., financial information, transaction information, demographic information, etc.), whether or not this information has been received directly from telematics device 180. For example, the information used to initiate a sub-insurance policy can be based on information directly acquired from primary unit provisioning server 120, user device 160, or a third party database, such as a police records or motor vehicle records database. Further still, the criteria used to determine whether a sub-insurer should insure part of the risk associated with the primary insurance policy of the user may be based on simultaneous satisfaction of two or more criteria associated with the received data.

For example, platform 110 may determine that the trigger for starting a sub-insurance policy associated with the user may be based on the amount of time that the user travels below a predetermined speed limit within a predetermined time period. In particular, platform 110 may determine that a sub-insurance policy should be initiated when the user drives below 55 miles per hour for greater than 70% of the time when driving an insured vehicle during the most recent month. As another example, platform 110 may determine that the trigger for starting a sub-insurance policy may be based on the average braking time to come to a complete stop when the user is driving an insured vehicle. In this example, platform 110 may determine that a sub-insurance policy should be initiated when the user brakes on average for more than one-half second to come to a complete stop while driving the insured vehicle during the most recent week. Further still, platform 110 may determine that the trigger for starting a sub-insurance policy may be based on whether the user brakes below a predetermined maximum braking rate (e.g., below a predetermined maximum rate of deceleration). In related aspects, the trigger for terminating a sub-insurance policy may be based on whether the user brakes above this predetermined maximum braking rate at or above a threshold number of times.

When real-time vehicle operational data is used to trigger a sub-insurance policy associated with the user, the sub-insurance policy can be initiated immediately based on current data. For example, the sub-insurance policy can be initiated by platform 110 based on an instantaneous change in driving behavior. More specifically, in the example above where the sub-insurance policy is triggered when the driver drives below a predetermined speed limit, platform 110 may determine that a sub-insurance policy should be initiated immediately after determining that the real-time telematics data indicates that the user is driving the insured vehicle below 55 miles per hour. In other words, the sub-insurance policy may be initiated as the user is driving her vehicle and changes from driving above 55 miles per hour to driving below 55 miles per hour.

With reference to FIG. 2B, once event control computing platform 110 determines that the at least one criterion for changing user data has been satisfied, platform 110 may transmit a request for authorizing the change to the user data to user device 160 in step 205 and may receive authorization to change the user data from user device 160 in step 206. If user device 160 does not provide authorization to change user data, then the process may stop and platform 110 may not proceed with changing user data. In other examples, platform 110 may not request authorization from the user of user device 160 either because the user has given prior authorization or because authorization is not required. In one example, the authorization requested by platform 110 may correspond to an authorization for initiating a sub-insurance policy for the user.

Figure 3:
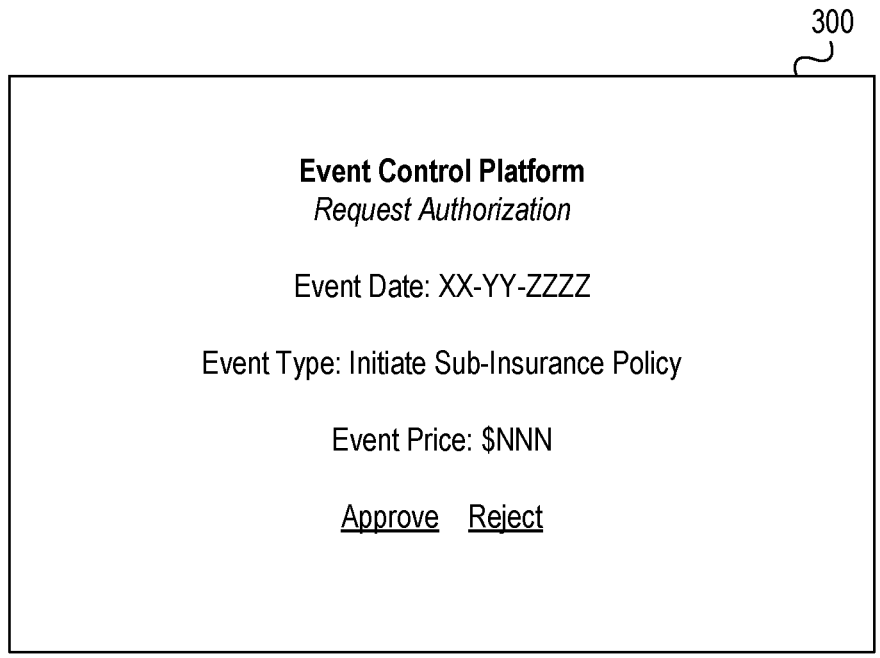
FIG. 3 depicts an example graphical user interface to obtain authorization for making a change to user data in accordance with one or more example embodiments.

To obtain authorization for making a change to user data, event control computing platform 110 may cause user device 160 to display and/or otherwise present a graphical user interface similar to graphical user interface 300, which is illustrated in FIG. 3. As shown in FIG. 3, graphical user interface 300 may include information related to the change in user data. For example, interface 300 may include the proposed date of the change to the user data and the type of change being requested (e.g., initiating a sub-insurance policy). Interface 300 may also include information related to a price (e.g., monthly premium) associated with the sub-insurance policy. A user of user device 160 may accept or reject the proposed event by selecting the appropriate option on interface 300.

With further reference to FIG. 2B, event control computing platform 110 may also transmit a request for authorization to change user data to primary unit provisioning server 120 in step 207 and may receive authorization to change user data from primary unit provisioning server 120 in step 208. If primary unit provisioning server 120 does not provide authorization to change user data, then the process may stop and platform 110 may not proceed with changing user data. In one example, the authorization requested by platform 110 may correspond to an authorization for initiating a sub-insurance policy for the user.

Figure 2C:
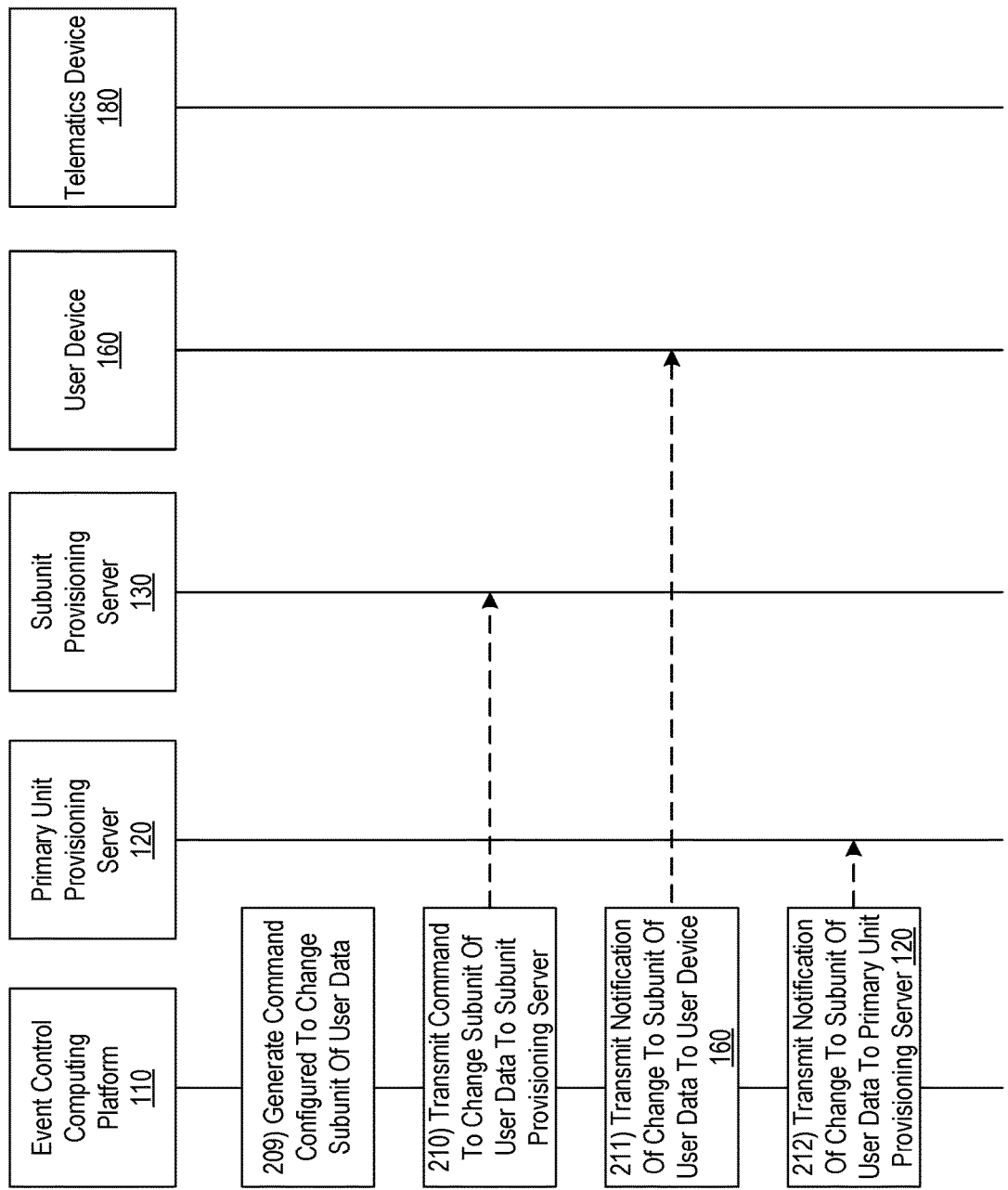

With reference to FIG. 2C, in step 209, event control computing platform 110 may generate a command configured to change a subunit of user data and then, in step 210, may transmit the command to change the subunit of user data to subunit provisioning server 130. In one example, this command may be configured to initiate a sub-insurance policy for the user and subunit provisioning server 130 may be managed by a sub-insurance provider to provision sub-insurance policies to one or more users.

Once the command to change a subunit of user data has been transmitted to subunit provisioning server 130, platform 110 may then transmit a notification of an actual change to a subunit of user data to user device 160 in step 211 and to primary unit provisioning server 120 in step 212. In one example, the change to the subunit of user data may correspond to an initiation of a sub-insurance policy.

With reference to FIG. 2D, next, in step 213, event control computing platform 213 may generate additional output based on the change to the user data. A first portion of this output may be transmitted to primary unit provisioning server 120 in step 214, a second portion of the output may be transmitted to subunit provisioning server 130 in step 215, and a third portion of the output may be transmitted to user device 160 in step 216. In one example, this additional output may correspond to a sub-insurance benefit. The sub-insurance benefit may represent the savings experienced by a primary insurance provider in insuring the user during the time that the sub-insurance policy is in effect. In some examples, platform 110 may not generate any additional output to be transmitted to various parties.

Figure 2E:
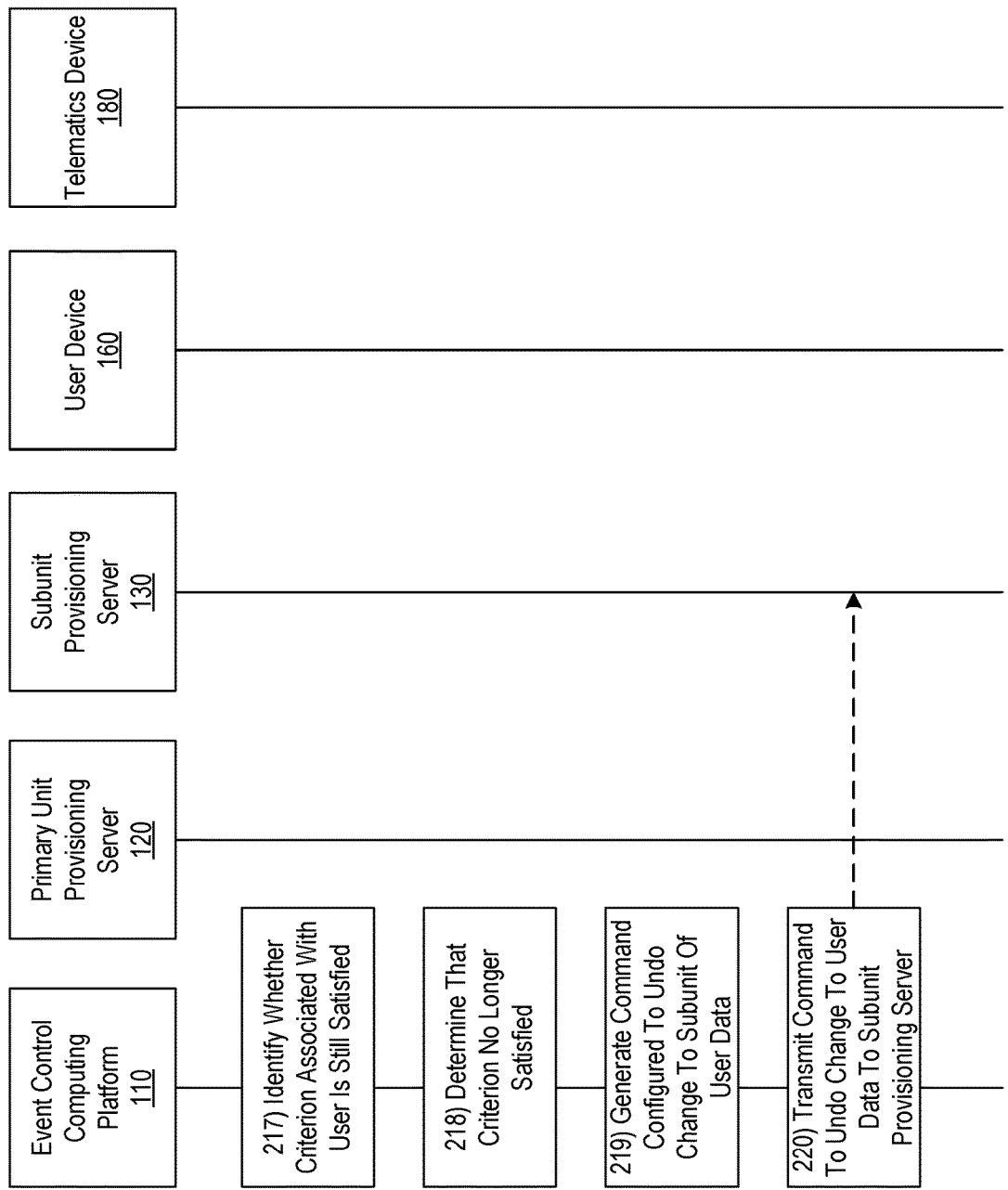

With reference to FIG. 2E, the process may then move to step 217 where event control computing platform 110 may identify if the at least one criterion associated with the user is still satisfied. If the at least one criterion associated with the user is still satisfied, then event control computing platform 110 may take no further action. However, at step 218, event control computing platform 110 may determine that the at least one criterion associated with the user is no longer satisfied. In one example, this criterion may relate to vehicle operational data received from telematics device 180. For example, platform 110 may determine that the user is no longer travelling below a predetermined speed in his vehicle.

Next, at step 219, event control computing platform 110 may generate a command configured to undo the change to the subunit of user data and in step 220, platform 110 may transmit the command to undo the change to the user data to subunit provisioning server 130. In one example, the command configured to undo the change to the subunit of user data may relate to terminating a sub-insurance policy associated with the user. In some aspects, if more than one sub-insurance policy is in effect, platform 110 may cause only those sub-insurance policies associated with criteria that are no longer satisfied to be terminated.

With reference to FIG. 2F, then, at step 221, event control computing platform 110 may transmit, to user device 160, a notification of the fact that the change to the subunit of user data has been undone. Finally, at step 222, platform 110 may transmit, to primary unit provisioning server 120, a notification of the fact that the change to the subunit of user data has been undone. In one example, this notification may relate to the termination of a sub-insurance policy associated with the user. In this example, when platform 110 terminates the sub-insurance policy associated with the user, primary unit provisioning server 120 may resume providing primary insurance to the user.

In the example where event control computing platform 110 controls events related to the initiation and termination of sub-insurance, assume that a primary insurance provider (via primary unit provisioning server 120) charges a thirty year old female $100 a month for an automobile insurance policy. Upon receipt of real-time telematics data for the thirty-year old female, event control computing platform 110 may determine that a sub-insurer can insure this user for $70 per month, assuming that she avoids hard braking (defined by how quickly she applies pressure to the braking mechanism given how fast she is driving). When she starts her morning drive to work, event control computing platform 110 may begin to receive real-time telematics data associated with the trip, including data from sensors associated with how fast she is driving and how much pressure she applies to the brake pedal. In some examples, event control computing platform 110 may monitor real-time telematics data for a predetermined start-up time period before making an initial decision to sub-insure a user. In this example, assume that there is no start-up period and that event control computing platform 110 makes its initial decision of whether to initiate a sub-insurance policy as soon as the user brakes for the first time. After determining that the user avoided hard braking, platform 110 may receive authorization to initiate a sub-insurance policy from the user's cell phone (e.g., user device 160) and primary unit provisioning sever 120. In some aspects, event control computing platform 110 may allow subunit provisioning server 130 to initiate a sub-insurance policy if platform 110 determines that the sub-insurer has adequately priced the sub-insurance policy. If platform 110 determines that the price for sub-insuring the user is too high, then platform 110 may deny server 130 the opportunity to sub-insure the user. In this example, assume that platform 110 determines that the sub-insurer has adequately priced the sub-insurance policy and so platform 110 allows subunit provisioning server 130 to initiate a sub-insurance policy.

Thus, in this example, event control computing platform 110 may determine that the sub-insurance benefit is $30 per month ($100–$70). This benefit may be transferred by event control computing platform 110 entirely to the primary insurance provider (i.e., to primary unit provisioning server 120) or entirely to the user (i.e., to user device 160). In other examples, platform 110 may determine that the entire sub-insurance benefit should be transmitted to the sub-insurer (i.e., to sub-insurance provisioning server 130). Alternatively, the benefit may be shared between the user, the primary insurance provider, and/or the sub-insurer. In this example, assume that platform 110 determines that the sub-insurance benefit is to be shared between the user and the primary insurance provider equally. Therefore, in this example, the user and the primary insurance provider may receive a benefit payment of $15 per month from platform 110. Such decisions made by platform 110, including decisions about who shares the sub-insurance benefit and which criteria are used to trigger/terminate a sub-insurance policy, may be programmed into platform 110 based on business logic associated with the collaboration between primary unit provisioning server 120 and subunit provisioning server 130.

Furthermore, in this example, as soon as event control computing platform 110 determines that the user has hard braked, platform 110 may terminate the sub-insurance policy so that the user is allowed to be insured solely by the primary insurance policy. For example, if platform 110 determines that the user from the example above has not hard braked for the first two months of her sub-insurance policy, she may receive $15 the first month and another $15 the second month (assuming that the sub-insurance benefit is being shared equally between the user and the primary insurance provider). If platform 110 then determines that the user has hard braked half way through the third month, then platform 110 may immediately cause the sub-insurance policy to be terminated. In some examples, the user and/or the primary insurance provider may forfeit the sub-insurance benefit for the third month. In other examples, the user and/or primary insurance provider may be entitled to all or a pro-rated portion of the sub-insurance benefit for the third month.

In this example, event control computing platform 110 may also receive one or more bids for sub-insuring the user from different subunit provisioning servers 130. These bids may be submitted by various types of entities, including entities that specialize in providing sub-insurance, entities that provide both primary and sub-insurance, or any other entity. Bids may include a proposed sub-insurance premium rate (e.g., $30 a month) and may be contingent on satisfaction of one or more criteria associated with a given user. In some aspects, this criteria may be based on information gleaned from vehicle operational data transmitted from telematics devices 180, 190. For example, a sub-insurance provider may place a sub-insurance bid contingent on the user driving during predetermined time periods in the day and within a predetermined zip code. Alternatively, a sub-insurance provider may place a bid contingent on the user following a predetermined vehicle maintenance schedule or driving in a predetermined area (e.g., hills, mountains, city, suburbs, etc.). When more than one bid has been submitted by different subunit provisioning servers 130 to event control computing platform 110, platform 110 may determine the lowest bid for sub-insuring the user. In some aspects, event control computing platform 110 may determine a lowest bid for each criterion on which the bid is based. For example, if two bids are received contingent on the user driving below a predetermined speed limit and two additional bids are received contingent on the user driving within a predetermined zip code, platform 110 may determine the lowest bid from the first set of two bids contingent on the user driving below a predetermined speed limit and the lowest bid from the second set of two bids contingent on the user driving within a predetermined zip code. In other aspects, event control computing platform 110 may group different criteria together to create a lowest bid for a criteria group. Once at least one lowest bid has been determined by event control computing platform 110, platform 110 may then transmit a conditional acceptance of sub-insurance to the entity providing the lowest bid for each criterion or criteria group (e.g., a given subunit provisioning server 130). The conditional acceptance may also be transmitted to primary unit provisioning server 120 associated with a primary insurance provider and/or to the relevant user computing device 160.

In addition, in this example embodiment, a user that has purchased primary insurance through a primary insurance provider may first have to approve the sub-insurance process before any information about the user is sent to potential sub-insurers (i.e., to subunit provisioning server 130) for sub-insuring the user's risk. In other aspects, the user may first have to accept one or more bids before a conditional acceptance is transmitted to the subunit provisioning server 130 corresponding to the entity submitting the lowest bid for a given criterion. By requiring the user to first accept a conditional offer of sub-insurance, the user may maintain some control over how sub-insurance is administered on her primary insurance policy and may veto a decision to market her primary insurance policy in the sub-insurance market. Involvement of the user may also allow the user to become aware of the conditions on which the acceptance is made. For example, if a conditional acceptance is based on the user driving below a predetermined speed threshold, the user can target her driving behavior to satisfy this condition.

Figure 4:
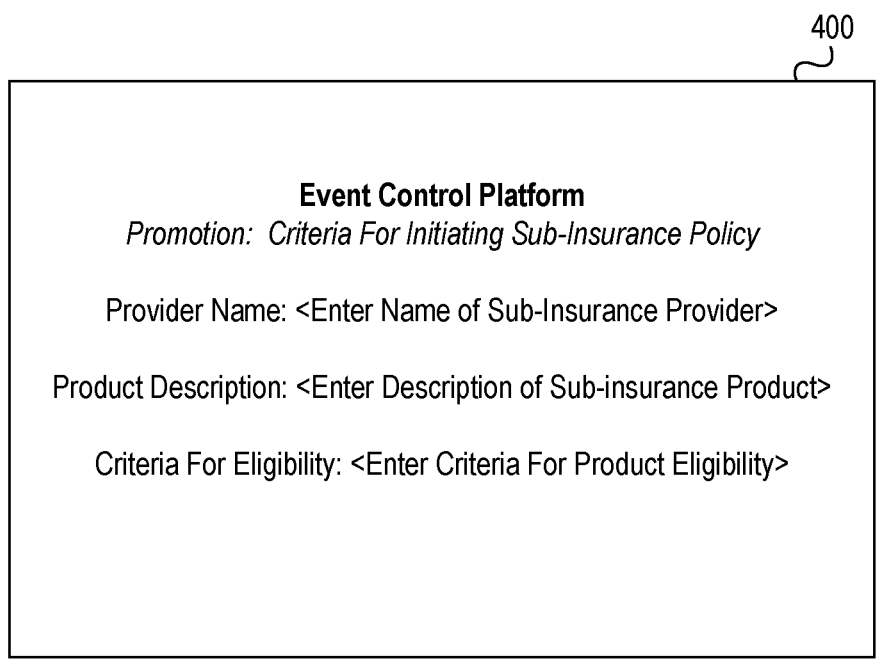
FIG. 4 depicts an example message transmitted from an event control computing platform in accordance with one or more example embodiments.

In a related example, event control computing platform 110 may market a sub-insurance policy to incentivize users to purchase a primary insurance policy. Moreover, platform 110 may also incentivize users to predetermined behavior by conditioning a sub-insurance benefit on the predetermined behavior. For example, platform 110 may want to incentivize the user to drive more slowly. Therefore, platform 110 may condition a sub-insurance benefit on exhibiting this behavior. In one example, platform 110 may transmit a message to user device 160 related to a sub-insurance opportunity, as shown in FIG. 4. Message 400 may indicate the name of the sub-insurance provider, a description of the sub-insurance product being marketed, and the various criteria that the user would have to meet to be eligible for the product.

In another example, the user may receive feedback from event control computing platform 110 on how to further reduce an insurance premium associated with a sub-insurance policy. For example, platform 110 may transmit a message to the user stating that he may further reduce his sub-insurance premium if he refrains from driving his insured vehicle after 10 p.m. or if he refrains from driving in the city. As another example, the sub-insurance benefit may include non-cash benefits. For example, platform 110 may transmit a message to the user stating that a certified lifeguard would be provided by the sub-insurer for reducing risk at a private pool party hosted by the user at the user's insured home.

In this example, event control computing platform 110 may determine information related to events in the user's life that may impact risk associated with an insurance policy owned by the user. For example, platform 110 may determine an origin, destination, and/or a desired arrival time associated with a road trip planned by the user (e.g., by interfacing with an electronic calendar of the user, by communicating with a mobile device in which the user has inputted the destination, etc.). Once this information has been determined, platform 110 may estimate the duration of a trip from the origin to the destination and then may determine a recommended departure time from the origin. Platform 110 may further determine a sub-insurance benefit (e.g., for a vehicle and/or a homeowner's insurance policy) to the user in response to determining that the actual departure time for the trip is at or prior to the recommended departure time. Event control computing platform 110 may then transmit a message with the sub-insurance benefit to the user (e.g., user computing device 160, 170).

Figure 5:
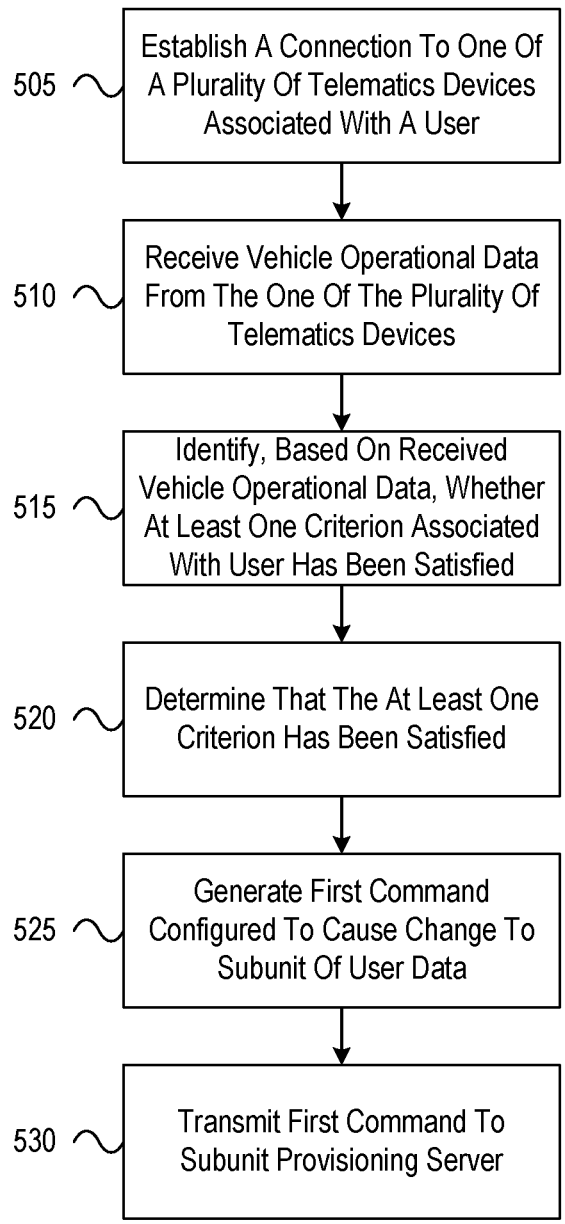
FIG. 5 depicts an illustrative method for multicomputer processing of user data with centralized event control in accordance with one or more example embodiments.

FIG. 5 depicts an illustrative method for multicomputer processing of user data with centralized event control in accordance with one or more example embodiments. Referring to FIG. 5, at step 505, a computing platform having at least one processor, a memory, and a communication interface may establish, via the communication interface, a connection to one of a plurality of telematics devices associated with a user. Subsequently, at step 510, the computing platform may receive, while the connection is established, vehicle operational data from the one of the plurality of telematics devices associated with the user. Then, at step 515, the computing platform may identify, based on the vehicle operational data, whether at least one criterion associated with the user has been satisfied, and at step 520, the computing platform may determine that the at least one criterion associated with the user has been satisfied. At step 525, the computing platform may generate a first command configured to cause a change to a subunit of user data in response to determining that the at least one criterion associated with the user has been satisfied. Finally, in step 530, the computing platform may transmit the first command to a subunit provisioning server.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
   establish, via the communication interface, a connection to one of a plurality of telematics devices associated with a user;
   while the connection is established, receive vehicle operational data from the one of the plurality of telematics devices associated with the user;
   identify, based on the vehicle operational data, whether at least one criterion associated with the user has been satisfied;

identify a subunit provisioning server from among a plurality of subunit provisioning servers that have submitted bids contingent upon one or more criteria groups, wherein the identified subunit provisioning server is identified based on corresponding bid being assessed in relation to each of the one or more criteria groups;

generate and trigger a first command configured to cause a change to a subunit of user data based on the identified subunit provisioning server, wherein the change to the subunit of user data includes at least partially transitioning an insurance coverage from a first insurance policy to send a second insurance policy and initiating temporary coverage provided by the second insurance policy, the temporary coverage provided until at least another criterion associated with the user has been satisfied; and transmit, via the communication interface, the first command to the identified subunit provisioning server.

2. The computing platform of claim 1, wherein the vehicle operational data comprises real-time vehicle operational data.

3. The computing platform of claim 1, wherein the at least one criterion associated with the user comprises one or more of driving a vehicle associated with the user below a predetermined speed, within a predetermined geographic area, not exceeding a maximum rate at which pressure is applied to a breaking mechanism associated with the vehicle.

4. The computing platform of claim 1, wherein the one or more criteria groups associated with the plurality of subunit provisioning servers correspond one or more bids.

5. The computing platform of claim 4, wherein identifying the identified subunit provisioning server is based on a comparison of the one or more bids.

6. The computing platform of claim 1, wherein the memory stores additional computer-readable instructions that, when executed by the at least one processor, cause the computing platform to: generate an output based on the change to the subunit of user data.

7. The computing platform of claim 6, wherein the memory stores additional computer-readable instructions that, when executed by the at least one processor, cause the computing platform to: transmit a first portion of the output to a user computing device and a second portion of the output to a primary unit provisioning server.

8. The computing platform of claim 6, wherein the memory stores additional computer-readable instructions that, when executed by the at least one processor, cause the computing platform to: transmit a first portion of the output to a user computing device, a second portion of the output to a primary unit provisioning server, and a third portion of the output to the subunit provisioning server.

9. The computing platform of claim 1, wherein the memory stores additional computer-readable instructions that, when executed by the at least one processor, cause the computing platform to: determine that the at least one criterion associated with the user is no longer satisfied.

10. The computing platform of claim 9, wherein the memory stores additional computer-readable instructions that, when executed by the at least one processor, cause the computing platform to: generate a second command configured to undo the change to the subunit of user data.

11. The computing platform of claim 10, wherein the second command configured to undo the change to the subunit of user data includes transitioning the coverage provided by the second insurance policy to the first insurance policy and initiating the insurance coverage from the first insurance policy.

12. A method, comprising:

at a computing platform comprising at least one processor, memory, and a communication interface:

establishing, via the communication interface, a connection to one of a plurality of telematics devices associated with a user;

while the connection is established, receiving vehicle operational data from the one of the plurality of telematics devices associated with the user;

identifying, based on the vehicle operational data, whether at least one criterion associated with the user has been satisfied;

identify a subunit provisioning server from among a plurality of subunit provisioning servers that have submitted bids contingent upon one or more criteria groups, wherein the identified subunit provisioning server is identified based on a corresponding bid being assessed in relation to each of the one or more criteria groups;

generating and triggering a first command configured to cause a change to a subunit of user data based on the identified subunit provisioning server, wherein the change to the subunit of user data includes at least partially transitioning an insurance coverage from a first insurance policy to a second insurance policy and initiating coverage provided by the second insurance policy, the temporary coverage provided until at least another criterion associated with the user has been satisfied; and transmitting, via the communication interface, the first command to the identified subunit provisioning server.

13. The method of claim 12, further comprising:
generating an output based on the change to the subunit of user data.

14. The method of claim 13, further comprising:
transmitting, via the communication interface, a first portion of the output to a user computing device, a second portion of the output to a primary unit provisioning server, and a third portion of the output to the subunit provisioning server.

15. The method of claim 13, further comprising:
transmitting, via the communication interface, a first portion of the output to a user computing device and a second portion of the output to a primary unit provisioning server.

16. The method of claim 12, wherein the user data is associated with a first level before the change to the subunit of the user data and the subunit of the user data is associated with a second level after the change to the subunit of user data.

17. The method of claim 12, further comprising:
determining that the at least one criterion associated with the user is no longer satisfied.

18. The method of claim 17, further comprising:
in response to the determining that the at least one criterion associated with the user is no longer satisfied, generating a second command configured to undo the change to the subunit of user data.

19. The method of claim 18, further comprising:
transmitting, via the communication interface, the second command to the subunit provisioning server.

20. One or more non-transitory computer-readable media storing instructions that, when executed by a computing platform comprising at least one processor, memory, and a communication interface, cause the computing platform to:
- establish, via the communication interface, a connection to one of a plurality of telematics devices associated with a user;
- while the connection is established, receive vehicle operational data from the one of the plurality of telematics devices associated with the user;
- identify, based on the vehicle operational data, whether at least one criterion associated with the user has been satisfied;
- identify a subunit provisioning server from among a plurality of subunit provisioning servers that have submitted bids contingent upon one or more criteria groups, wherein the identified subunit provisioning server is identified based on a corresponding bid being assessed in relation to each of the one or more criteria groups;
- generate and trigger a command configured to cause a change to a subunit of user data based on the identified subunit provisioning server, wherein the change to the subunit of user data includes at least partially transitioning an insurance coverage from a first insurance policy to a second insurance policy and immediately initiating coverage provided by the second insurance policy, the temporary coverage provided until at least another criterion associated with the user has been satisfied; and
- transmit, via the communication interface, the command to the identified subunit provisioning server.

* * * * *